US 11,421,546 B2

(12) United States Patent
Yoshida et al.

(10) Patent No.: US 11,421,546 B2
(45) Date of Patent: Aug. 23, 2022

(54) NOZZLE VANE (71) Applicant: MITSUBISHI HEAVY INDUSTRIES ENGINE & TURBOCHARGER, LTD., Sagamihara (JP)

(72) Inventors: Toyotaka Yoshida, Tokyo (JP); Bipin Gupta, Tokyo (JP); Yuki Yamada, Tokyo (JP); Yosuke Dammoto, Sagamihara (JP); Yoji Akiyama, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/430,487

(22) PCT Filed: Feb. 25, 2019

(86) PCT No.: PCT/JP2019/007144
§ 371 (c)(1),
(2) Date: Aug. 12, 2021

(87) PCT Pub. No.: WO2020/174551
PCT Pub. Date: Sep. 3, 2020

(65) Prior Publication Data
US 2022/0145772 A1 May 12, 2022

(51) Int. Cl.
*F01D 17/16* (2006.01)
*F02B 37/24* (2006.01)
*F01D 5/14* (2006.01)

(52) U.S. Cl.
CPC ........... *F01D 17/165* (2013.01); *F01D 5/141* (2013.01); *F02B 37/24* (2013.01); *F05D 2220/40* (2013.01); *F05D 2240/128* (2013.01)

(58) Field of Classification Search
CPC ........ F01D 17/165; F01D 5/141; F02B 37/24; F05D 2220/40; F05D 2240/128
See application file for complete search history.

(56) References Cited

FOREIGN PATENT DOCUMENTS

WO  WO 2006/032827 A1    3/2006
WO  WO-2006032827 A1 *   3/2006  ........... F01D 17/165

OTHER PUBLICATIONS

International Search Report, issued in PCT/JP2019/007144, dated Apr. 23, 2019.
Written Opinion of the International Searching Authority, issued in PCT/JP2019/007144, dated Apr. 23, 2019.

* cited by examiner

*Primary Examiner* — Audrey B. Walter
*Assistant Examiner* — Edward Bushard
(74) *Attorney, Agent, or Firm* — Birch, Stewart, Kolasch & Birch, LLP (57) ABSTRACT

A nozzle vane of a variable geometry turbocharger comprises: a nozzle vane body rotatably disposed in an exhaust gas passage defined between a shroud surface and a hub surface; and a flange portion provided on at least one of a shroud-side end surface or a hub-side end surface of the nozzle vane body, and formed around a center of rotation of the nozzle vane body. The flange portion is formed to satisfy the expression (i): R1<R2 or (ii): R4<R3, where R1 is the shortest distance from the center of rotation to an outer edge of the flange portion on the trailing edge side and on a suction surface of the nozzle vane, R2 is the shortest distance from the center of rotation to the outer edge of the flange portion on the leading edge side and on the suction surface of the nozzle vane, R3 is the shortest distance from the center of rotation to the outer edge of the flange portion on the leading edge side and on a pressure surface of the nozzle vane, and R4 is the shortest distance from the center of rotation to the outer edge of the flange portion on the trailing edge side and on the pressure surface of the nozzle vane.

7 Claims, 11 Drawing Sheets

R1<R2 ··· (i)
R3<R2 ··· (iii)

NOZZLE VANE

TECHNICAL FIELD

The present disclosure relates to a nozzle vane for a variable geometry turbocharger.

BACKGROUND

In recent years, various variable geometry turbochargers which can change the flow characteristics of exhaust gas by adjusting the nozzle opening degree have been developed to improve fuel efficiency. A configuration of such a variable geometry turbocharger is disclosed in Patent Document 1.

CITATION LIST

Patent Literature

Patent Document 1: WO2006/032827A

SUMMARY

Problems to be Solved

A nozzle vane of a variable geometry turbocharger is rotatably disposed in an exhaust gas passage defined between a shroud surface and a hub surface, and there are gaps on both sides of the nozzle vane between each side and the shroud surface or the hub surface. Further, the nozzle vane is supported by a rotational shaft on at least one of the shroud surface side or the hub surface side, and is configured to change the nozzle opening degree by being rotated around the rotational shaft.

When the output power of the variable geometry turbocharger is low, the opening degree of the nozzle vane is low, and the exhaust gas flow into the gaps on both sides of the nozzle vane as described above has a relatively large influence on the performance of the variable geometry turbocharger.

In this regard, the conventional nozzle vane as disclosed in Patent Document 1 has a flange portion at the end of the nozzle vane on the rotational shaft side, and the flow of exhaust gas into the gap on one side where the rotational shaft and the flange portion exist is worse than the flow of exhaust gas into the gap on the other side. Therefore, the performance of the variable geometry turbocharger at low power may degrade. However, Patent Document 1 does not disclose any findings to improve the flow of exhaust gas into the gap around the rotational shaft among the gaps on both sides of the nozzle vane.

In view of the above, an object of at least one embodiment of the present disclosure is to provide a nozzle vane that can improve the flow of exhaust gas around the nozzle vane in a variable geometry turbocharger.

Solution to the Problems (1) A nozzle vane according to at least one embodiment of the present invention is a nozzle vane of a variable geometry turbocharger, comprising: a nozzle vane body rotatably disposed in an exhaust gas passage defined between a shroud surface and a hub surface; and a flange portion provided on at least one of a shroud-side end surface or a hub-side end surface of the nozzle vane body, and formed around a center of rotation of the nozzle vane body. The flange portion is formed to satisfy the following expression (i) or (ii):

$$R1 < R2 \quad (i)$$

$$R4 < R3 \quad (ii)$$

where R1 is the shortest distance from the center of rotation to an outer edge of the flange portion on the trailing edge side and on a suction surface of the nozzle vane, R2 is the shortest distance from the center of rotation to the outer edge of the flange portion on the leading edge side and on the suction surface of the nozzle vane, R3 is the shortest distance from the center of rotation to the outer edge of the flange portion on the leading edge side and on a pressure surface of the nozzle vane, and R4 is the shortest distance from the center of rotation to the outer edge of the flange portion on the trailing edge side and on the pressure surface of the nozzle vane.

With the above configuration (1), since R1 is smaller than R2, the exhaust gas flowing from upstream on the suction surface and passing near the center of rotation easily flows into the gap between the shroud surface or the hub surface and the nozzle vane, where the rotational shaft is disposed, downstream of the flange portion 50, so that it is possible to improve the exhaust gas flow around the center of rotation. Further, since R4 is smaller than R3, the exhaust gas flowing into the gap from the suction surface side can smoothly flow out into the exhaust gas passage on the pressure surface side downstream of the flange portion 50. Thus, since the exhaust gas flow around the flange portion of the nozzle vane or the rotational shaft can be improved, the performance of the variable geometry turbocharger at low power can be improved.

(2) In some embodiments, in the above configuration (1), the flange portion may include an exhaust-gas-passage-side flange surface facing the exhaust gas passage, and the exhaust-gas-passage-side flange surface may include an edge portion formed in a convex arc shape protruding to the exhaust gas passage.

With the configuration in which the edge portion of the exhaust-gas-passage-side flange surface of the flange portion is formed in a convex arc shape protruding to the exhaust gas passage as in the above (2), it is possible to effectively suppress the exhaust gas flowing along the exhaust-gas-passage-side flange surface and then into the gap on the rotational shaft side of the nozzle vane from being separated when it passes through the edge portion of the passage-side flange surface. Thus, the generation of turbulence and swirl caused by separation can be suppressed, so that the flow of exhaust gas through the gap can be improved, and the performance of the variable geometry turbocharger at low power can be improved.

(3) In some embodiments, in the above configuration (1) or (2), the flange portion may be formed on the hub-side end surface of the nozzle vane body.

With the above configuration (3), it is possible to achieve the effect described in the above (1) or (2) in the nozzle vane having the flange portion on the hub-side end surface of the nozzle vane body.

(4) In some embodiments, in the above configuration (1) or (2), the flange portion may be formed on the shroud-side end surface of the nozzle vane body.

With the above configuration (4), it is possible to achieve the effect described in the above (1) or (2) in the nozzle vane having the flange portion on the shroud-side end surface of the nozzle vane body.

(5) In some embodiments, in the above configuration (1) or (2), the flange portion may be formed on the hub-side end surface and the shroud-side end surface of the nozzle vane body.

With the above configuration (5), it is possible to achieve the effect described in the above (1) or (2) in the nozzle vane having the flange portion on the hub-side end surface and the shroud-side end surface of the nozzle vane body.

(6) In some embodiments, in any one of the above configurations (1) to (5), the flange portion may satisfy the following expression (iii).

$$R3<R2 \qquad (iii)$$

With the above configuration (6), it is possible to efficiently distribute exhaust gas around the flange portion, for example, when the variable geometry turbocharger is operated with a large difference between the flow rate of exhaust gas flowing into the suction surface and the flow rate of exhaust gas flowing into the pressure surface.

(7) In some embodiments, in any one of the above configurations (1) to (5), the flange portion may satisfy the following expression (iv).

$$R2<R3 \qquad (iv)$$

With the above configuration (7), it is possible to efficiently distribute exhaust gas around the flange portion, for example, when the variable geometry turbocharger is operated with a large difference between the flow rate of exhaust gas flowing into the suction surface and the flow rate of exhaust gas flowing into the pressure surface.

Advantageous Effects

At least one embodiment of the present disclosure provides a nozzle vane that can improve the flow of exhaust gas around the nozzle vane in a variable geometry turbocharger.

BRIEF DESCRIPTION OF DRAWINGS

FIG. 5 are a diagram showing the shape of the nozzle vane according to an embodiment.

FIG. 6 are a contour diagram showing the magnitude of entropy on the pressure surface side of the nozzle vane.

FIG. 7 are a contour diagram showing the pressure around the nozzle vane.

FIG. 8 are a contour diagram showing the streamlines around the nozzle vane.

DETAILED DESCRIPTION

Embodiments of the present invention will now be described in detail with reference to the accompanying drawings. However, the scope of the present invention is not limited to the following embodiments. It is intended that dimensions, materials, shapes, relative positions and the like of components described in the embodiments shall be interpreted as illustrative only and not intended to limit the scope of the present invention.

First, a schematic configuration of a variable geometry turbocharger to which a nozzle vane according to an embodiment of the present disclosure is applied will be described.

Figure 1:
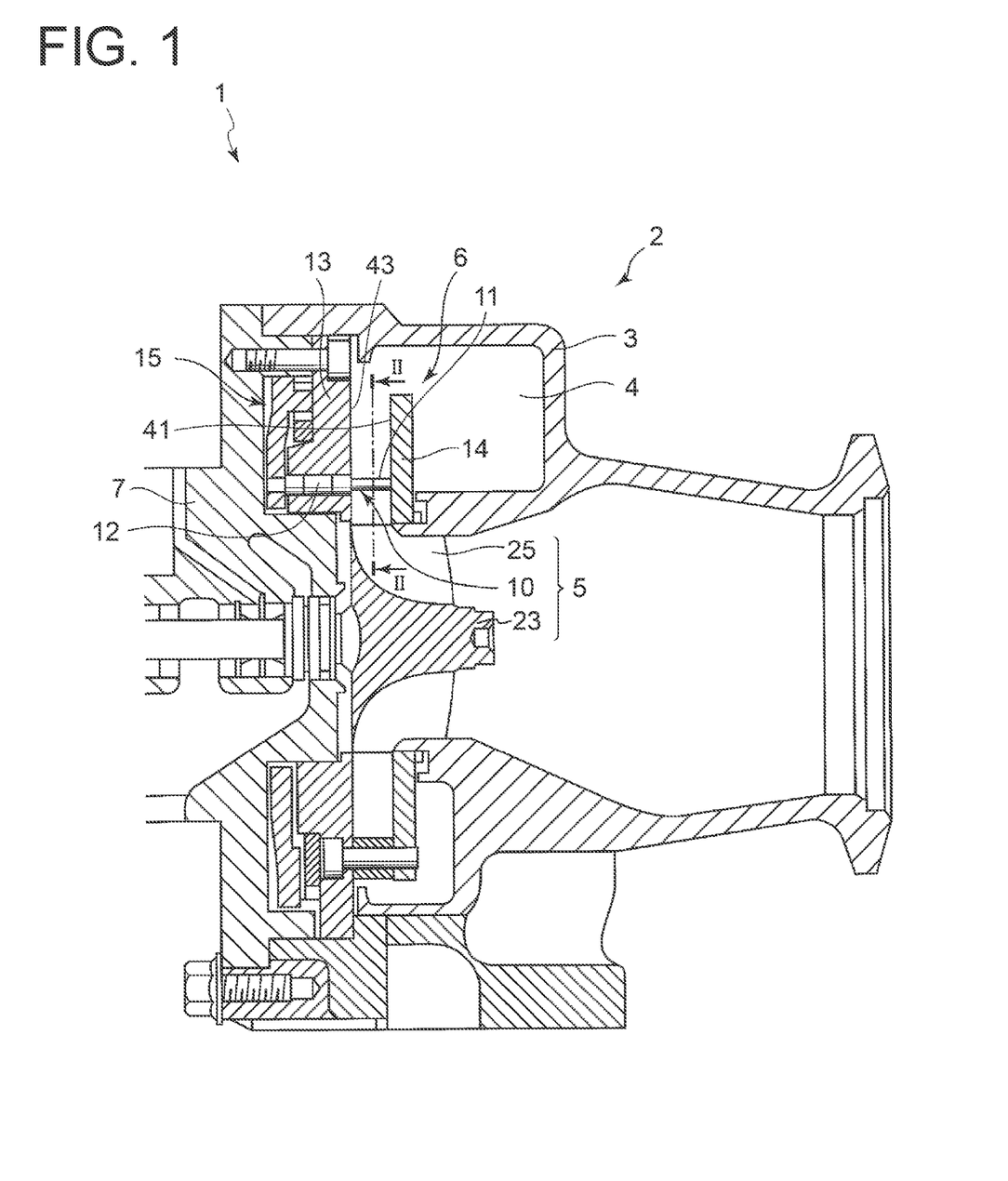
FIG. 1 is a cross-sectional view of a turbine of a variable geometry turbocharger including a nozzle vane according to a first embodiment of the present disclosure.
Figure 2:
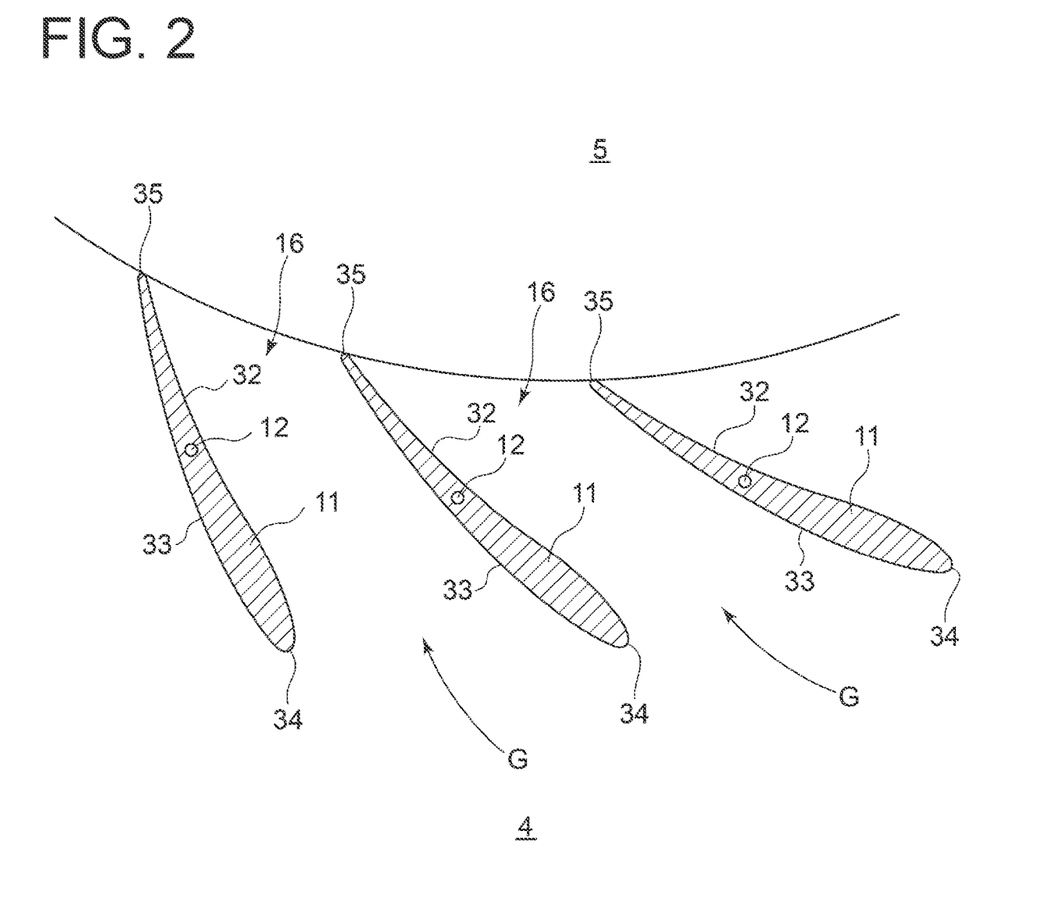
FIG. 2 is a cross-sectional view taken along line II-II in FIG. 1.

FIG. 1 is a cross-sectional view of a turbine of a variable geometry turbocharger including a nozzle vane according to a first embodiment of the present disclosure. FIG. 2 is a cross-sectional view taken along line II-II in FIG. 1.

As shown in FIG. 1, a turbine 2 of a variable geometry turbocharger 1 includes a turbine housing 3 having a turbine scroll 4 of spiral shape, a turbine wheel 5 rotatably disposed on the radially inner side of the turbine scroll 4 in the turbine housing 3, and a variable nozzle mechanism 6 for controlling the flow passage area of exhaust gas G flowing from the turbine scroll 4 to the turbine wheel 5.

The turbine wheel 5 includes a hub 23 rotatably supported by a bearing housing 7, and a plurality of blades 25 (turbine blades) disposed on the outer circumference of the hub 23 at intervals in the circumferential direction.

The variable nozzle mechanism 6 includes a nozzle 10, a nozzle mount 13 fixed to the bearing housing 7, and a nozzle plate 14 disposed so as to face the nozzle mount 13 with a distance.

In this disclosure, a partition section including the nozzle plate 14 and the turbine housing 3 surrounding the turbine wheel 5 is referred to as a shroud, the surface of the nozzle plate 14 facing the nozzle mount 13 is referred to as a shroud surface 41, and the surface of the nozzle mount 13 facing the nozzle plate 14 is referred to as a hub surface 43.

The nozzle 10 has a plurality of nozzle vanes 11 disposed so as to surround the turbine wheel 5, and a nozzle shaft 12 fixed to each nozzle vane 11. Each nozzle shaft 12 is rotatably supported to the nozzle mount 13. Each nozzle shaft 12 is connected to an actuator (not shown) via a link mechanism 15. Each nozzle shaft 12 rotates by the torque provided by the actuator. With rotation of each nozzle shaft 12, the nozzle vane 11 rotates.

As shown in FIG. 2, an exhaust gas passage 16 through which the exhaust gas G having passed through the turbine scroll 4 flows is formed between adjacent nozzle vanes 11, 11. Across the exhaust gas passage 16, a side of the turbine scroll 4 on the outer peripheral side has high pressure due to the exhaust gas G, and a side of the turbine wheel 5 on the inner peripheral side has low pressure. The exhaust gas G having passed through the turbine scroll 4 flows into the exhaust gas passage 16 at a certain flow angle. At this time, the pressure is increased on a pressure surface 32 (described later) of the nozzle vane 11 which faces the flow, while the pressure is low on a suction surface 33 (described later).

Next, the nozzle vane 11 according to an embodiment of the present disclosure will be described in detail.

Figure 3:
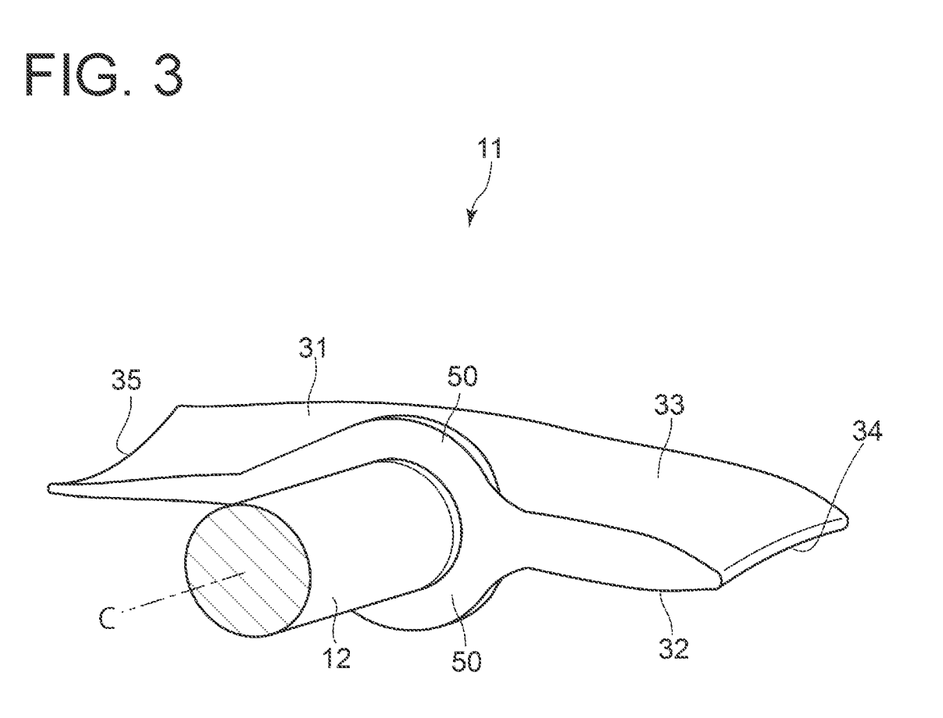
FIG. 3 is a perspective view showing the shape of the nozzle vane according to an embodiment, showing the suction surface viewed from the rotational shaft side and the leading edge side.
Figure 4:
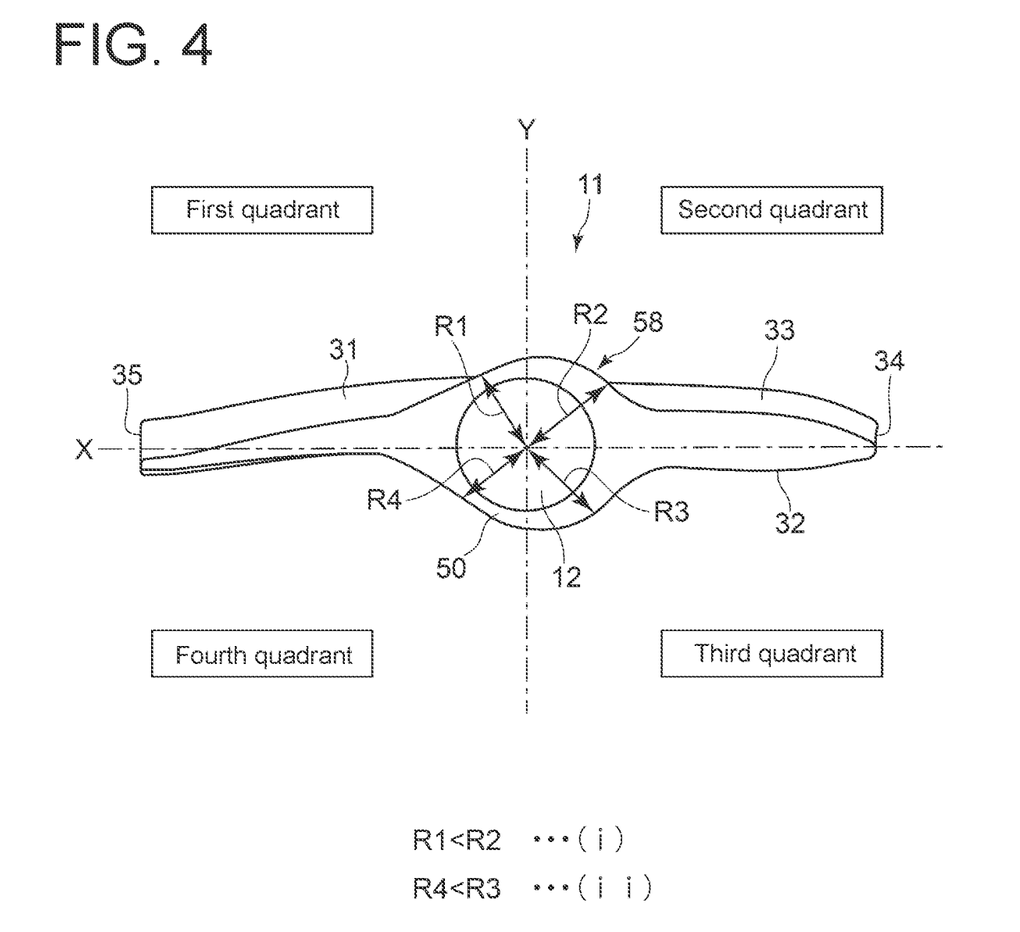
FIG. 4 is a perspective view, for describing the shape of the nozzle vane according to an embodiment, showing the state viewed from the nozzle shaft.

FIG. 3 is a perspective view showing the shape of the nozzle vane according to an embodiment, showing the suction surface viewed from the rotational shaft side and the leading edge side. FIG. 4 is a perspective view, for describing the shape of the nozzle vane according to an embodiment, showing the state viewed from the nozzle shaft.

As illustrated in FIG. 3, the nozzle vane 11 according to at least one embodiment of the present invention is the nozzle vane 11 of the variable geometry turbocharger 1 and includes a nozzle vane body 31 rotatably disposed in the exhaust gas passage 16 defined between the shroud surface 41 and the hub surface 43, and a flange portion 50 provided on at least one of a shroud-side end surface 51 or a hub-side end surface of the nozzle vane body, and formed around the center of rotation C of the nozzle vane body 31.

The nozzle vane body 31 has an airfoil defined by the pressure surface 32, the suction surface 33 facing the opposite side to the pressure surface 32, the leading edge 34, and the trailing edge 35. The nozzle vane body 31 is rotatably supported by the nozzle mount 13 via the nozzle shaft 12 serving as the rotational shaft along the direction perpendicular to the chord direction and parallel to the leading edge 34 or the trailing edge 35 (i.e., the width direction of the nozzle vane body 31) between the leading edge 34 and the trailing edge 35 in the chord direction.

The flange portion 50 is generally provided on the hub-side end surface 52 or the shroud-side end surface 51 of the nozzle vane body 31, on the side where the link mechanism 15 or the nozzle shaft 12 is located, and has a function as a lid to prevent exhaust gas G from flowing into the space in which the link mechanism 15 is housed.

For example as shown in FIG. 4, the flange portion 50 of the present disclosure is formed to satisfy the following expression (i) or (ii):

$$R1 < R2 \tag{i}$$

$$R4 < R3 \tag{ii}$$

where R1 is the shortest distance from the center of rotation C to the outer edge 58 of the flange portion 50 on the trailing edge 35 side and on the suction surface 33 of the nozzle vane 11 (for example, referred to as the first quadrant), R2 is the shortest distance to the outer edge 58 of the flange portion 50 on the leading edge 34 side and on the suction surface 33 (for example, referred to as the second quadrant), R3 is the shortest distance to the outer edge 58 of the flange portion 50 on the leading edge 34 side and on the pressure surface 32 of the nozzle vane 11 (for example, referred to as the third quadrant), and R4 is the shortest distance to the outer edge 58 of the flange portion 50 on the trailing edge 35 side and on the pressure surface 32 (for example, referred to as the fourth quadrant).

In other words, the flange portion 50 in the present disclosure is formed asymmetrically on the leading edge 34 side and the trailing edge 35 side with respect to a plane perpendicular to the chord direction of the nozzle vane body 31 and including the axis of the nozzle shaft 12 (a plane perpendicular to the chord direction of the nozzle vane body 31 and passing through the Y-axis) such that the shortest distance to the outer edge 58 of the flange portion 50 on the trailing edge 35 side is smaller than the shortest distance to the outer edge 58 of the flange portion 50 on the leading edge 34 side.

Figure 9:
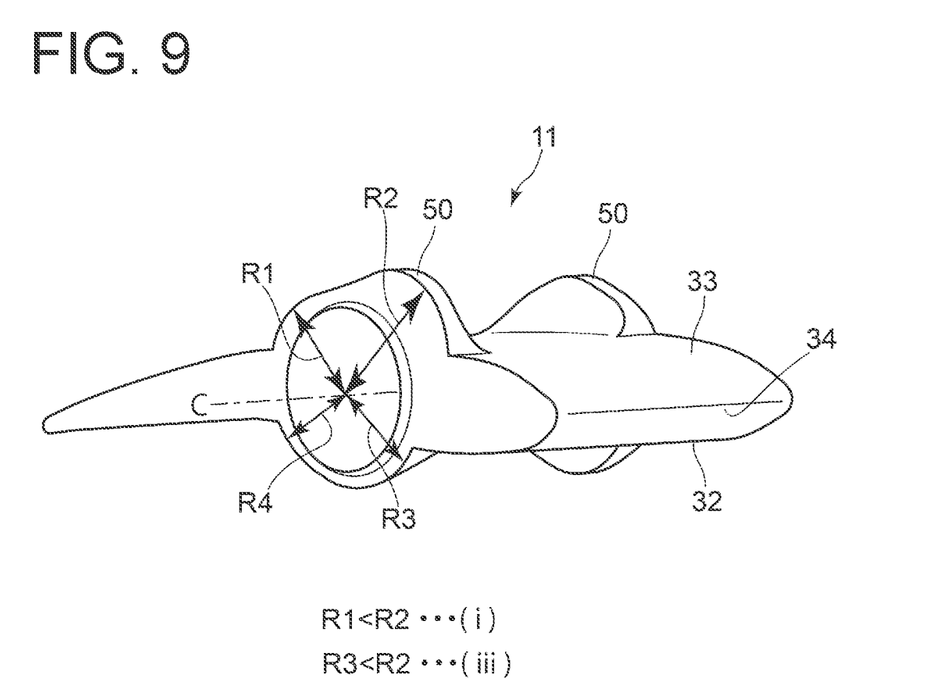
FIG. 9 is a perspective view showing an example of the shape of the nozzle vane according to another embodiment.
Figure 10:
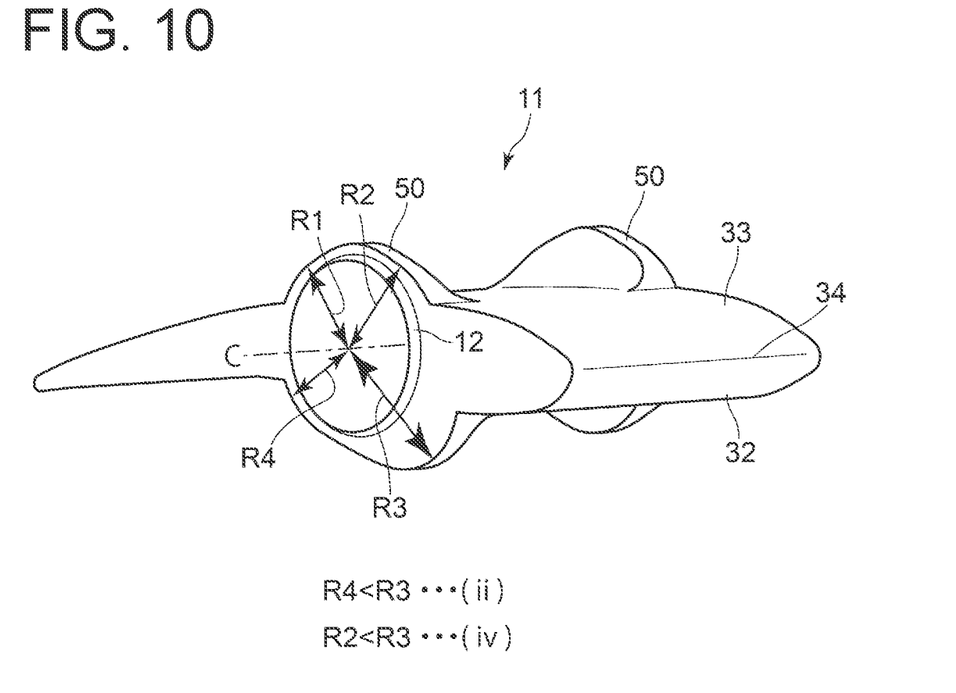
FIG. 10 is a perspective view showing an example of the shape of the nozzle vane according to another embodiment.
Figure 11:
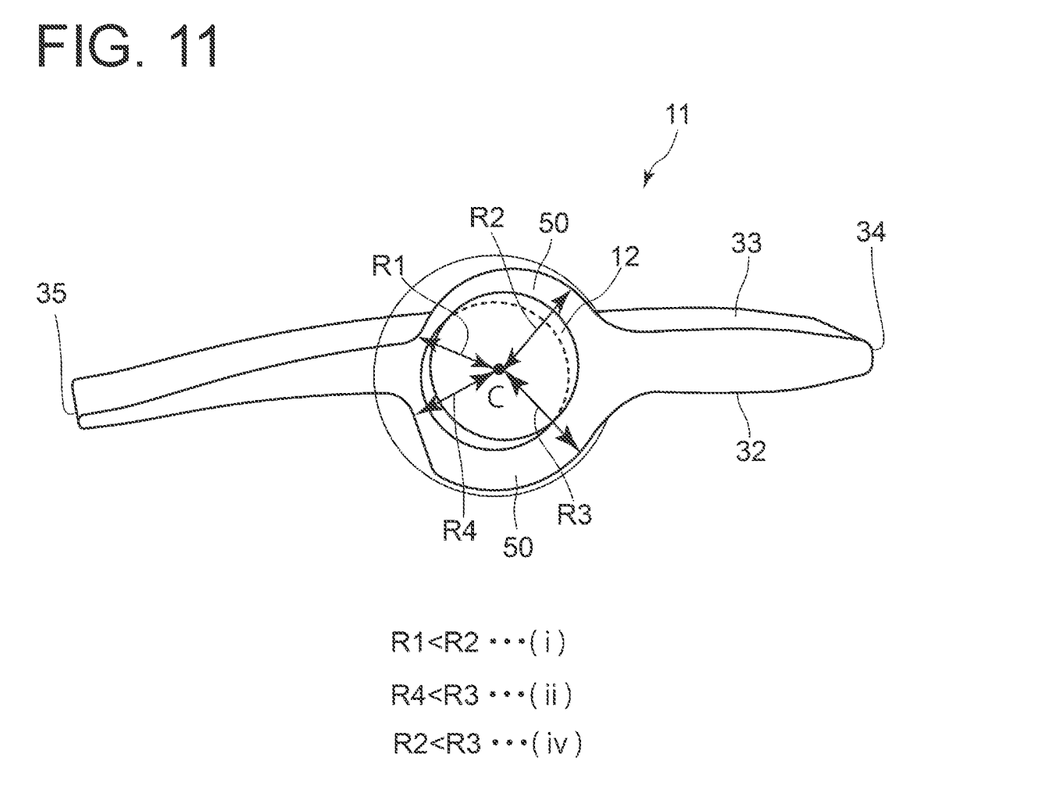
FIG. 11 is a perspective view showing an example of the shape of the nozzle vane according to another embodiment.

The flange portion 50 as described above may be configured such that, for example, the connection or boundary between the outer edge 58 of the flange portion 50 and the suction surface 33 or the pressure surface 32 on the trailing edge 35 side is smaller in distance from the center of rotation C than the connection or boundary between the outer edge 58 of the flange portion 50 and the suction surface 33 or the pressure surface 32 on the leading edge 34 side (see for example, R1, R2 in FIG. 9, R3, R4 in FIG. 10, R1, R2 and R3, R4 in FIG. 11).

However, the flange portion 50 may be configured such that the connection or boundary between the outer edge 58 of the flange portion 50 and the suction surface 33 or the pressure surface 32 on the trailing edge 35 side is greater in distance from the center of rotation C than the connection or boundary between the outer edge 58 of the flange portion 50 and the suction surface 33 or the pressure surface 32 on the leading edge 34 side. In this case, the flange portion 50 may be formed such that, for example, in the axial view of the nozzle shaft 12, the outer edge 58 has a gentle inclination to the chord direction on the trailing edge 35 side than on the leading edge 34 side (see for example, FIGS. 3, 4 and 5B).

Such a flange portion 50 may be configured such that the outer edge 58 is continuous with the suction surface 33 and the pressure surface 32 of the nozzle vane body 31 in a smooth curve in the axial view of the nozzle shaft 12. More specifically, end portions of the outer edge 58 of the flange portion 50 on the suction surface 33 on the leading edge 34 side and the trailing edge 35 side may be configured to each continue to the suction surface 33 with a smooth curve that is concave toward the exhaust gas passage 16 that the end portion faces. Further, end portions of the outer edge 58 of the flange portion 50 on the pressure surface 32 on the leading edge 34 side and the trailing edge 35 side may be configured to each continue to the pressure surface 32 with a smooth curve that is concave toward the exhaust gas passage 16 that the end portion faces.

With the above configuration, since R1 is smaller than R2, the exhaust gas G flowing from upstream on the suction surface 33 and passing near the center of rotation C easily flows into the gap 18 between the shroud surface 41 or the hub surface 43 and the nozzle vane 11, where the nozzle shaft 12 (rotational shaft) is disposed, downstream of the flange portion 50, so that it is possible to improve the exhaust gas G flow around the center of rotation C. Further, since R4 is smaller than R3, the exhaust gas G flowing into the gap 18 from the suction surface 33 side can smoothly flow out into the exhaust gas passage 16 on the pressure surface 32 side downstream of the flange portion 50. Thus, since the exhaust gas G flow around the flange portion 50 of the nozzle vane 11 or the nozzle shaft 12 can be improved, the performance of the variable geometry turbocharger 1 (particularly, the performance of the variable geometry turbocharger 1 at low power) can be improved.

Figure 5A:
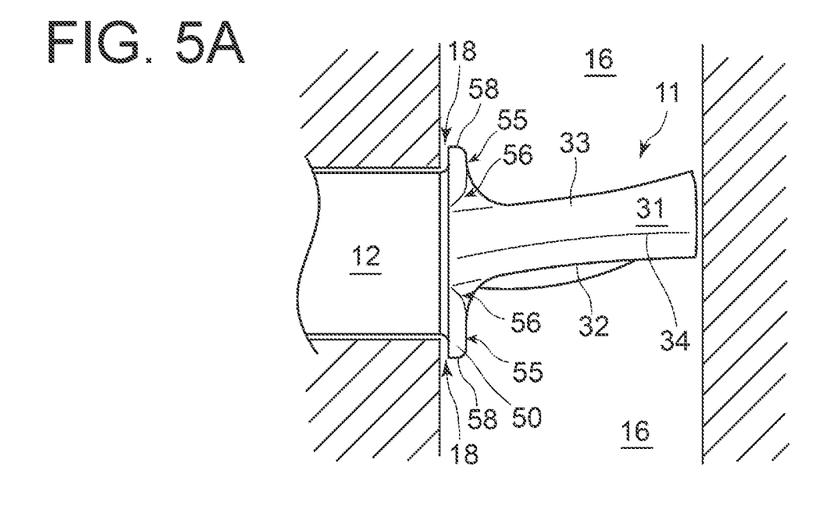
FIG. 5A is a view from the leading edge side.
Figure 5B:
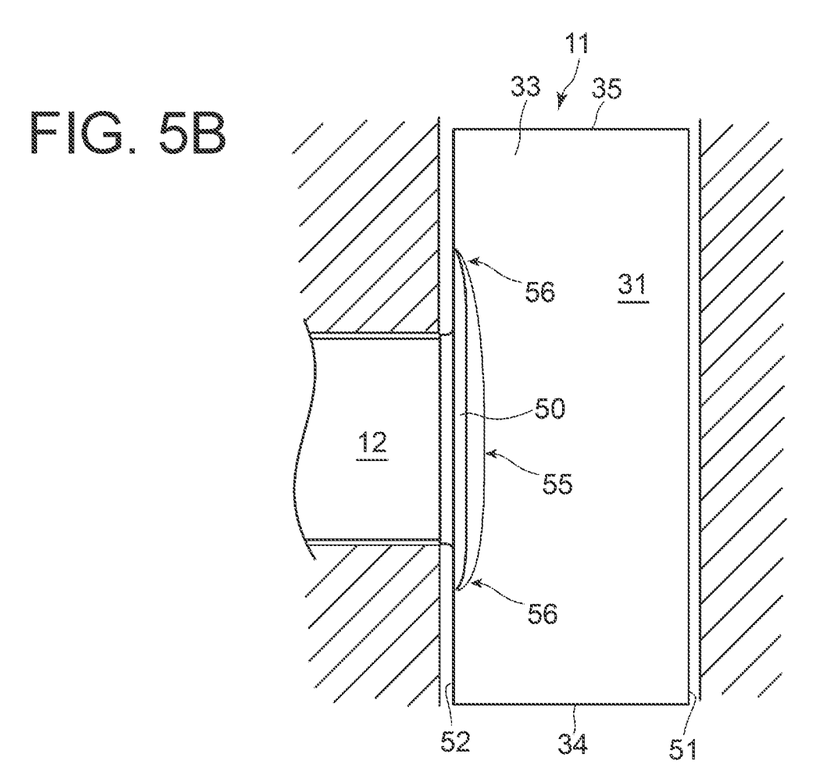
FIG. 5B is a view from the suction surface side.

FIG. 5 are a diagram showing the shape of the nozzle vane according to an embodiment; FIG. 5A is a view from the leading edge side, and FIG. 5B is a view from the suction surface side.

In some embodiments, in the above configuration, for example as illustrated in FIGS. 5A and 5B, the flange portion 50 includes an exhaust-gas-passage-side flange surface 55 facing the exhaust gas passage 16. The exhaust-gas-passage-side flange surface 55 may include an edge portion 56 formed in a convex arc shape protruding to the exhaust gas passage 16.

The edge portion 56 is formed in a convex shape with no corners (or rounded corners due to a smooth curved surface) compared to the conventional flange portion, which is formed in a cylindrical or conical shape with a ridge or boundary where the peripheral portion and the bottom portion intersect at a predetermined angle. The edge portion 56 is formed such that, for example, as it goes away from the center of rotation C, the distance from the end surface of the nozzle vane body 31 on the side where the nozzle shaft 12 exists (e.g., the hub-side end surface 52 when the nozzle shaft 12 is disposed on the hub surface 43 side, and the shroud-side end surface 51 when the nozzle shaft 12 is disposed on the shroud surface 41 side) progressively decreases.

The edge portion 56 may be formed on at least a part of the outer edge 58 of the flange portion 50, or may be formed as a smooth curved surface over the entire circumference of the outer edge 58 of the flange portion 50.

The curvature of the edge portion 56 on the leading edge 34 side of the flange portion 50 may be the same or different from the curvature of the edge portion 56 on the trailing edge 35 side of the same. Further, the curvature of the edge portion 56 may be uniform, for example, on the leading edge 34 side or the trailing edge 35 side, or may be partially different at any point, and may be freely set so that the points are formed smoothly and continuously.

With reference to FIGS. 6, 7, and 8, the effect of the flange portion 50 having the above configuration will be described.

Figure 6A:
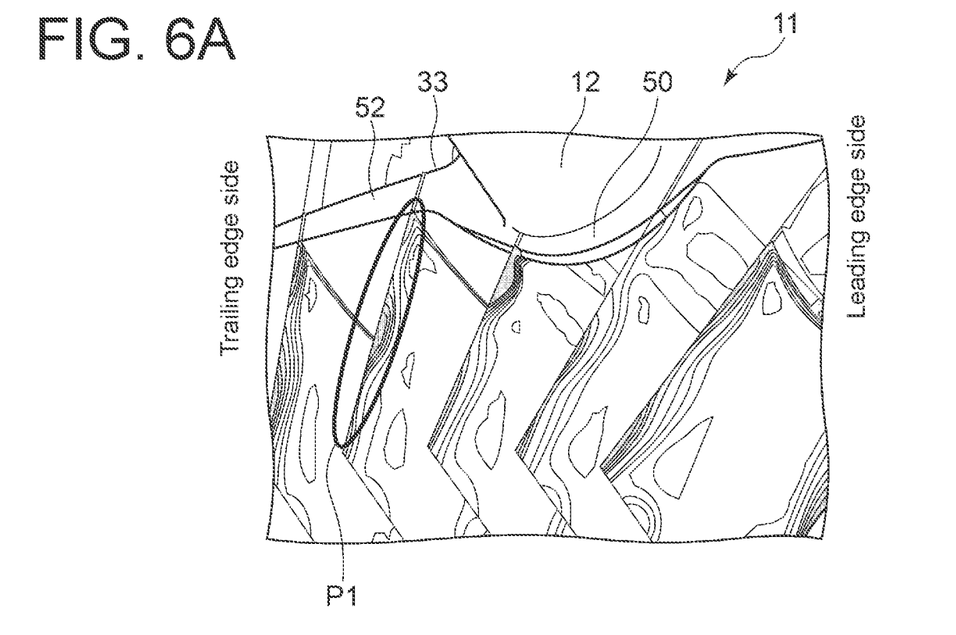
FIG. 6A shows the nozzle vane according to an embodiment.
Figure 6B:
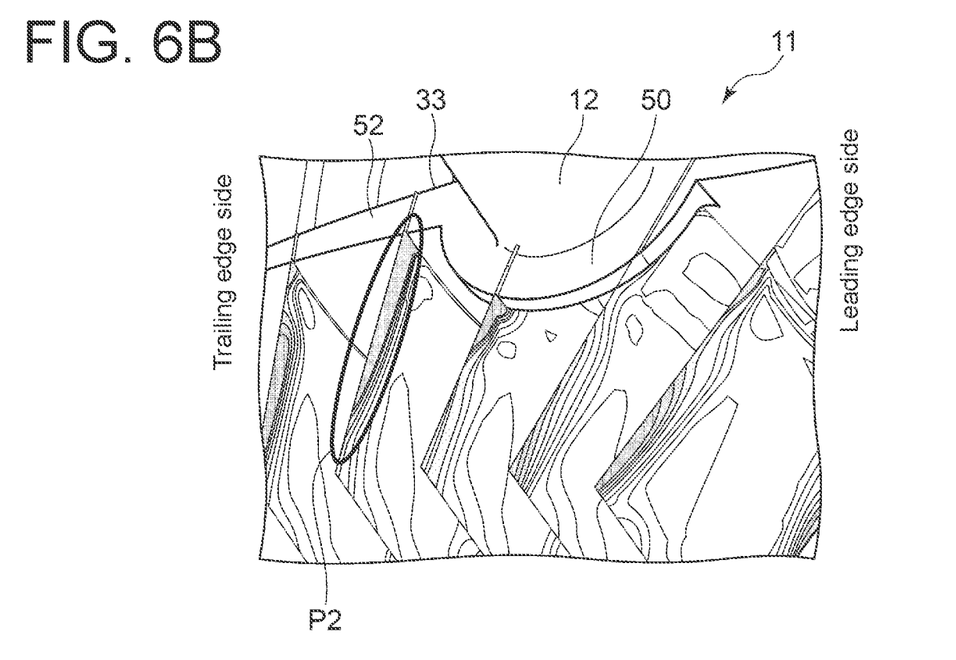
FIG. 6B shows the conventional nozzle vane as a comparative example.
Figure 7A:
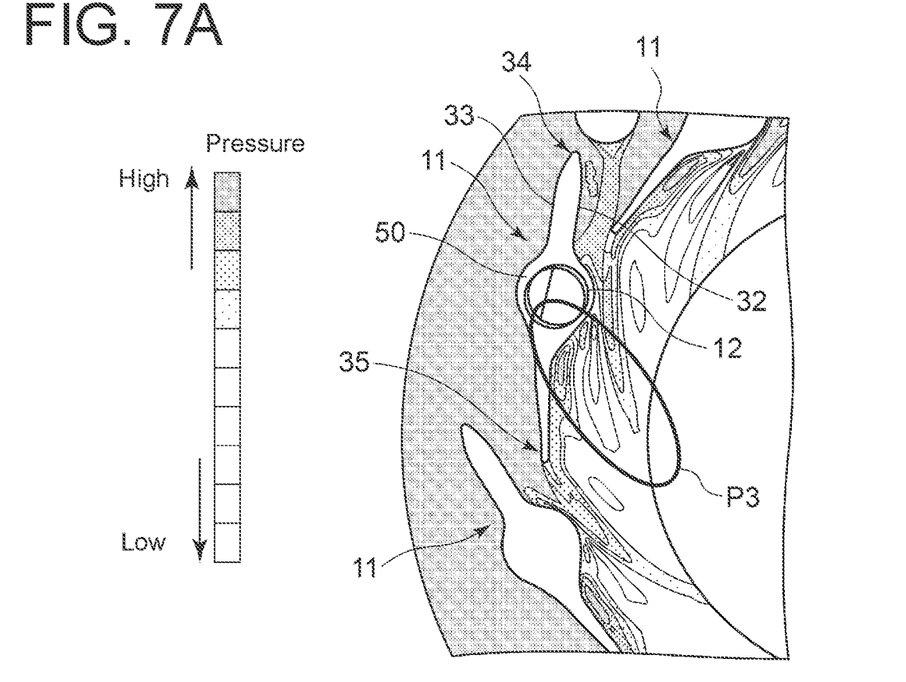
FIG. 7A shows the nozzle vane according to an embodiment.
Figure 7B:
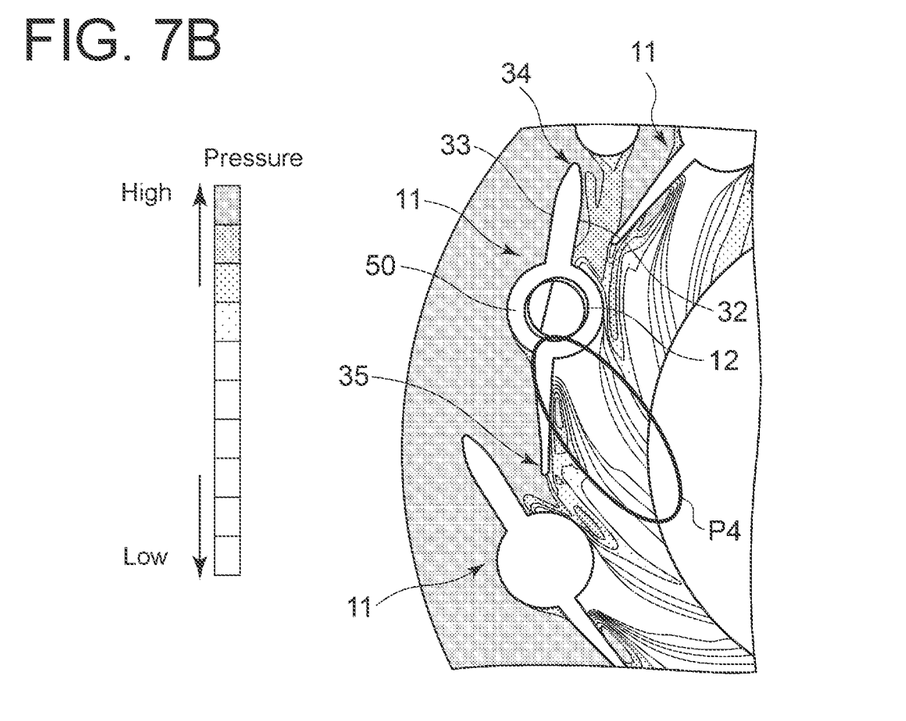
FIG. 7B shows the conventional nozzle vane as a comparative example.
Figure 8A:
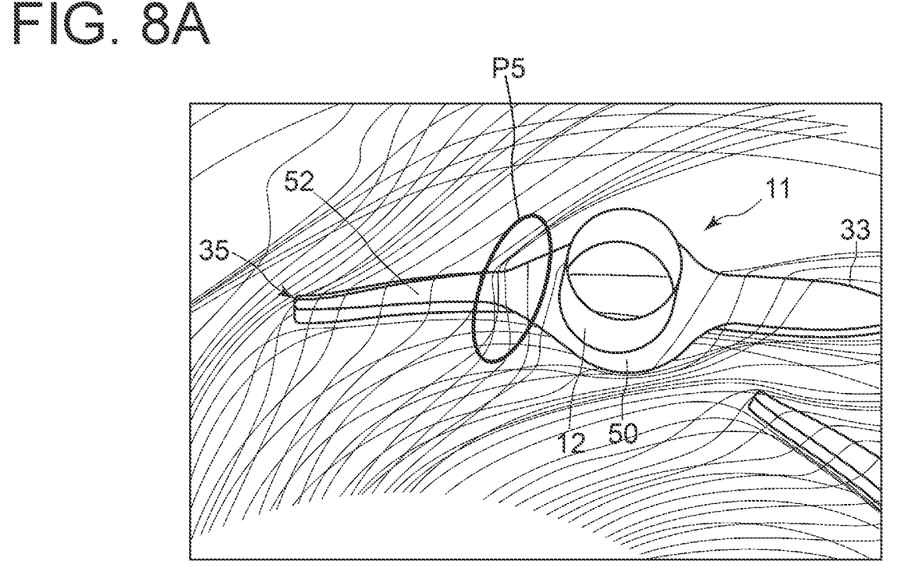
FIG. 8A shows the nozzle vane according to an embodiment.

FIG. 6 are a contour diagram showing the magnitude of entropy on the pressure surface side of the nozzle vane; FIG. 6A shows the nozzle vane according to an embodiment, and FIG. 6B shows the conventional nozzle vane as a comparative example. FIG. 7 are a contour diagram showing the pressure around the nozzle vane; FIG. 7A shows the nozzle vane according to an embodiment, and FIG. 7B shows the conventional nozzle vane as a comparative example. FIG. 8 are a contour diagram showing the streamlines around the nozzle vane; FIG. 8A shows the nozzle vane according to an embodiment, and FIG. 8B shows the conventional nozzle vane as a comparative example.

First, referring to FIGS. 6A and 6B, it can be seen that the entropy of the area P1 located on the trailing edge 35 side of the nozzle shaft 12 on the pressure surface 32 of the nozzle vane 11 of the present disclosure shown in FIG. 6A is lower than the entropy of the area P2 located on the trailing edge 35 side of the nozzle shaft 12 on the pressure surface 32 of the conventional nozzle vane shown as a comparative example in FIG. 6B. The figure shows how much loss occurs in the flow of exhaust gas G. The higher the entropy, the greater the loss. Therefore, from FIGS. 6A and 6B, it can be seen that the flow loss of exhaust gas G can be significantly reduced by employing the nozzle vane 11 of the present disclosure including the flange portion 50.

Next, referring to FIGS. 7A and 7B, it can be seen that the pressure of the area P3 located on the trailing edge 35 side of the nozzle shaft 12 on the pressure surface 32 of the nozzle vane 11 of the present disclosure shown in FIG. 7A is higher than the pressure of the area P4 located on the trailing edge 35 side of the nozzle shaft 12 on the pressure surface 32 of the conventional nozzle vane shown as a comparative example in FIG. 7B. Therefore, from FIGS. 7A and 7B, it can be seen that the pressure loss of exhaust gas G passing around the flange portion 50 can be significantly reduced by employing the nozzle vane 11 of the present disclosure including the flange portion 50.

Figure 8B:
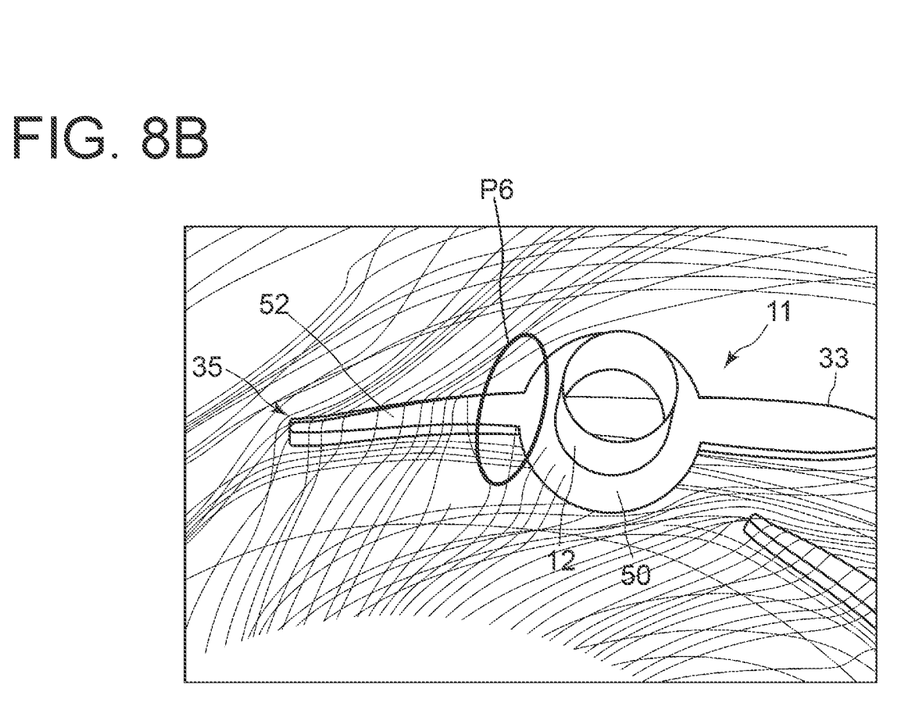
FIG. 8B shows the conventional nozzle vane as a comparative example.

Further, referring to FIGS. 8A and 8B, it can be seen that in the area P6 located on the trailing edge 35 side of the nozzle shaft 12 on the pressure surface 32 of the conventional nozzle vane shown as a comparative example in FIG. 8B, there are few (or almost no) streamlines of the flow of exhaust gas G passing through the area P6, so that the shape of the conventional flange portion causes separation in the flow of exhaust gas G and deteriorates the flow around the flange portion. In contrast, on the pressure surface 32 of the nozzle vane 11 of the present disclosure shown in FIG. 8A, there are effective streamlines indicating the flow of exhaust gas G through the area P5 located on the trailing edge 35 side of the nozzle shaft 12. Therefore, from FIGS. 8A and 8B, it can be seen that the flow of exhaust gas G passing around the flange portion 50 can be significantly improved by employing the nozzle vane 11 of the present disclosure including the flange portion 50.

Thus, with the configuration in which the edge portion 56 of the exhaust-gas-passage-side flange surface 55 of the flange portion 50 is formed in a convex arc shape protruding to the exhaust gas passage 16, it is possible to effectively suppress the exhaust gas G flowing along the exhaust-gas-passage-side flange surface 55 and then into the gap 18 on the nozzle shaft 12 serving as the rotational shaft of the nozzle vane 11 from being separated when it passes through the edge portion 56 of the passage-side flange surface 55. Thus, the generation of turbulence and swirl caused by separation can be suppressed, so that the flow of exhaust gas G through the gap 18 can be improved, and the performance of the variable geometry turbocharger 1 at low power can be improved.

In some embodiments, in any of the above configurations, for example as illustrated in FIGS. 5A and 5B, the flange portion 50 may be formed on the hub-side end surface 52 of the nozzle vane body 31.

With this configuration, it is possible to achieve the effect described in the above-described embodiment in the nozzle vane 11 having the flange portion 50 on the hub-side end surface 52 of the nozzle vane body 31.

Further, in some embodiments, in any of the above configurations, the flange portion 50 may be formed on the shroud-side end surface 51 of the nozzle vane body 31. The effect of the flange portion 50 disposed on the shroud-side end surface 51 on the flow of exhaust gas G in the exhaust gas passage 16 is the same as when the flange portion 50 is disposed on the hub-side end surface 52 as described above, and a description is therefore omitted.

With the above configuration in which the flange portion 50 is disposed on the shroud-side end surface 51 of the nozzle vane body 31, it is possible to achieve the effect described in the above-described embodiment in the nozzle vane 11 having the flange portion 50 on the shroud-side end surface 51 of the nozzle vane body 31.

FIG. 9 is a perspective view showing an example of the shape of the nozzle vane according to another embodiment. FIG. 10 is a perspective view showing an example of the shape of the nozzle vane according to another embodiment.

In some embodiments, in any of the above configurations, for example as illustrated in FIGS. 9 and 10, the flange portion 50 may be formed on the hub-side end surface 52 and the shroud-side end surface 51 of the nozzle vane body 31.

In other words, the flange portion 50 may be formed on each side of the nozzle vane body 31 in the width direction.

With the above configuration in which the flange portion 50 is disposed on each side of the nozzle vane body 31, it is possible to achieve the effect described in the above-described embodiment in the nozzle vane having the flange portion on the hub-side end surface 52 and the shroud-side end surface 51 of the nozzle vane body 31.

In some embodiments, in any of the above configurations, for example as illustrated in FIG. 9, the flange portion 50 may satisfy the following expression (iii).

$$R2 > R3 \qquad \text{(iii)}$$

Specifically, the flange portion 50 according to some embodiments may be configured such that the shortest distance R2 to the outer edge 58 of the flange portion 50 on the leading edge 34 side and on the suction surface 33 (for example, the second quadrant) is greater than the shortest distance R3 to the outer edge 58 of the flange portion 50 on the leading edge 34 side and on the pressure surface 32 of the nozzle vane 11 (for example, the third quadrant).

In the example shown in FIG. 9, the flange portion 50 satisfying the expression (iii) is disposed on both the shroud-side end surface 51 and the hub-side end surface 52, but the flange portion 50 satisfying the expression (iii) may be disposed on either one of the shroud-side end surface 51 or the hub-side end surface 52.

Thus, with the configuration in which the shortest distance R2 to the outer edge 58 of the flange portion 50 on the leading edge 34 side and on the suction surface 33 is greater than the shortest distance R3 to the outer edge 58 of the flange portion 50 on the leading edge 34 side and on the pressure surface 32 of the nozzle vane 11 (R2>R3), it is possible to efficiently distribute exhaust gas G around the flange portion 50, for example, when the variable geometry turbocharger 1 is operated with a large difference between the flow rate of exhaust gas G flowing into the suction surface 33 and the flow rate of exhaust gas G flowing into the pressure surface 32 (for example, when the inflow amount of exhaust gas G on the suction surface 33 side is larger than the inflow amount of exhaust gas G on the pressure surface 32 side).

In some embodiments, in any of the above configurations, for example as illustrated in FIGS. 10 to 11, the flange portion 50 may satisfy the following expression (iv).

$$R2<R3 \tag{iv}$$

Specifically, the flange portion 50 according to some embodiments may be configured such that the shortest distance R2 to the outer edge 58 of the flange portion 50 on the leading edge 34 side and on the suction surface 33 (for example, the second quadrant) is smaller than the shortest distance R3 to the outer edge 58 of the flange portion 50 on the leading edge 34 side and on the pressure surface 32 of the nozzle vane 11 (for example, the third quadrant).

For example as shown by the example of FIG. 10, the flange portion 50 may be disposed on both the shroud-side end surface 51 and the hub-side end surface 52. Alternatively, for example as shown by the example of FIG. 11, the flange portion 50 may be disposed on either one of the shroud-side end surface 51 or the hub-side end surface 52.

Thus, with the configuration in which the shortest distance R2 to the outer edge 58 of the flange portion 50 on the leading edge 34 side and on the suction surface 33 is smaller than the shortest distance R3 to the outer edge 58 of the flange portion 50 on the leading edge 34 side and on the pressure surface 32 of the nozzle vane 11 (R2<R3), it is possible to efficiently distribute exhaust gas G around the flange portion 50, for example, when the variable geometry turbocharger 1 is operated with a large difference between the flow rate of exhaust gas G flowing into the suction surface 33 and the flow rate of exhaust gas G flowing into the pressure surface 32 (for example, when the inflow amount of exhaust gas G on the pressure surface 32 side is larger than the inflow amount of exhaust gas G on the suction surface 33 side).

At least one embodiment of the present disclosure provides the nozzle vane 11 that can improve the flow of exhaust gas G around the nozzle vane 11 in the variable geometry turbocharger 1.

REFERENCE SIGNS LIST

1 Variable geometry turbocharger
2 Turbine
3 Turbine housing (Shroud)
4 Turbine scroll
5 Turbine wheel (Turbine rotor)
6 Variable nozzle mechanism
7 Bearing housing
10 Nozzle
11 Nozzle vane
12 Nozzle shaft (Rotational shaft)
13 Nozzle mount
14 Nozzle plate
15 Link mechanism
16 Exhaust gas passage
18 Gap
23 Hub
25 Turbine blade
31 Nozzle vane body
32 Pressure surface
33 Suction surface
34 Leading edge
35 Trailing edge
41 Shroud surface
43 Hub surface
50 Flange portion
51 Shroud-side end surface
52 Hub-side end surface
55 Exhaust-passage-side flange surface
56 Edge portion
58 Outer edge
L Chord length (Nozzle vane body)
G Exhaust gas
C Center of rotation

The invention claimed is:

1. A nozzle vane of a variable geometry turbocharger, comprising: a nozzle vane body rotatably disposed in an exhaust gas passage defined between a shroud surface and a hub surface; and
a flange portion provided on at least one of a shroud-side end surface or a hub-side end surface of the nozzle vane body, and formed around a center of rotation of the nozzle vane body,
wherein the flange portion is formed to satisfy the following expression (i) or (ii):

$$R1<R2 \tag{i}$$

$$R4<R3 \tag{ii}$$

where R1 is the shortest distance from the center of rotation to an outer edge of the flange portion on the trailing edge side and on a suction surface of the nozzle vane, R2 is the shortest distance from the center of rotation to the outer edge of the flange portion on the leading edge side and on the suction surface of the nozzle vane, R3 is the shortest distance from the center of rotation to the outer edge of the flange portion on the leading edge side and on a pressure surface of the nozzle vane, and R4 is the shortest distance from the center of rotation to the outer edge of the flange portion on the trailing edge side and on the pressure surface of the nozzle vane.

2. The nozzle vane according to claim 1, wherein the flange portion includes an exhaust-gas-passage-side flange surface facing the exhaust gas passage, and the exhaust-gas-passage-side flange surface includes an edge portion formed in a convex arc shape protruding to the exhaust gas passage.

3. The nozzle vane according to claim 1, wherein the flange portion is formed on the hub-side end surface of the nozzle vane body.

4. The nozzle vane according to claim 1, wherein
the flange portion is formed on the shroud-side end surface of the nozzle vane body.

5. The nozzle vane according to claim 1, wherein
the flange portion is formed on the hub-side end surface and the shroud-side end surface of the nozzle vane body.

6. The nozzle vane according to claim 1, wherein
the flange portion satisfies the following expression (iii):

$$R3 < R2 \qquad \text{(iii)}.$$

7. The nozzle vane according to claim 1, wherein
the flange portion satisfies the following expression (iv):

$$R2 < R3 \qquad \text{(iv)}.$$

* * * * *